Figure 1:
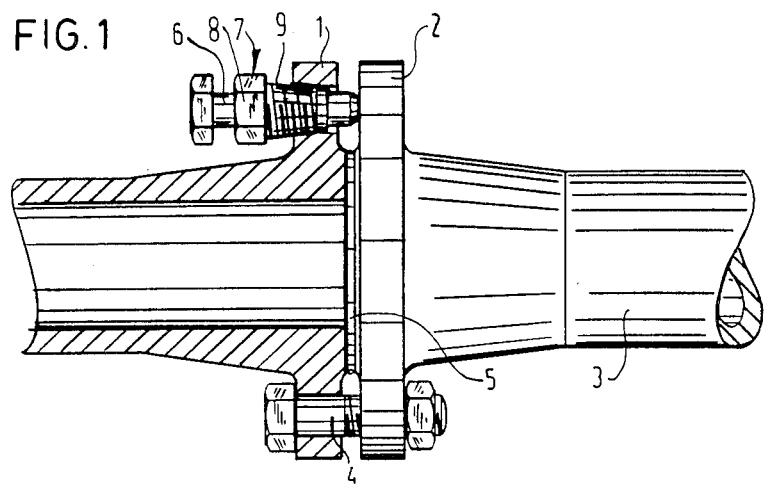

United States Patent [19]

Verstraeten

[11] Patent Number: 4,610,064
[45] Date of Patent: Sep. 9, 1986

[54] DEVICE FOR SPREADING FLANGES

[75] Inventor: Paul F. M. Verstraeten, Terneuzen, Netherlands

[73] Assignee: 501 Peinemann Equipment B.V., Netherlands

[21] Appl. No.: 713,892

[22] Filed: Mar. 20, 1985

[30] Foreign Application Priority Data

Mar. 21, 1984 [NL] Netherlands ............. 8400898

[51] Int. Cl.⁴ .............................. B23P 19/04
[52] U.S. Cl. ......................... 29/239; 29/256; 411/412; 411/423; 411/426
[58] Field of Search ............ 29/239, 256, 264; 411/411, 412, 413, 423, 426

[56] References Cited

U.S. PATENT DOCUMENTS

| | | | |
|---|---|---|---|
| 1,468,334 | 9/1923 | Thomason | 29/264 |
| 1,804,935 | 5/1931 | Jacobus | 29/239 |
| 1,930,859 | 10/1933 | Munroe | 29/256 |
| 2,591,451 | 4/1952 | Lynch et al. | 29/264 |
| 4,015,324 | 4/1977 | Lutter | 29/239 |

FOREIGN PATENT DOCUMENTS

| | | |
|---|---|---|
| 2522817 | 5/1975 | Fed. Rep. of Germany . |
| 616022 | 10/1926 | France ................... 29/239 |
| 2500090 | 2/1982 | France . |
| 8003882 | 7/1980 | Netherlands . |

Primary Examiner—James L. Jones, Jr.
Attorney, Agent, or Firm—John P. Snyder

[57] ABSTRACT

A device for spreading two flanges (1, 2) mounted in opposite position in a pipe system (3), which device mainly comprises a conical screw element (7) to be inserted into a continuous hole of a flange, said element having an axial opening, in which fits a pressure member (6) having a pressure head face for the axial displacement of the pressure member in said opening, wherein the screw element (7) has a screwthread with at least three leads in order to adapt said device for a greater variety of hole diameters in the flanges (1, 2) and to guarantee the necessary guiding of the conical screw element (7) during insertion thereof.

10 Claims, 4 Drawing Figures

DEVICE FOR SPREADING FLANGES

The invention relates to a device for spreading two flanges mounted in opposite positions in a pipe system, which device mainly comprises a conical screw element to be inserted into a continuous hole of a flange, said element having an axial opening, in which fits a pressure member having a pressure head face for the axial displacement of the pressure member in said opening.

Such a device is known from Dutch patent application No. 8003882. The device shown therein is provided with screw elements having a cylindrical end part accurately fitting in the continuous hole of a flange in order to guarantee the necessary guiding of the conical screw element during insertion thereof. Screwing in obliquely produces undesirable extra bending stress in the pressure member, which may bring about undesirable damage. Moreover, the screw element may then snap off. The disadvantage of the cylindrical end part of the screw element is that for different hole diameters in the flanges different screw elements have to be kept on stock.

The invention has for its object to obviate said disadvantage and to design the screw element in a manner such that a much smaller number of screw elements will be sufficient for a greater variety of hole diameters in the flanges.

The device embodying the invention is distinguished in that the screw element has a screwthread with at least three leads.

Thanks to the use of at least three leads the screw element is always in contact with the flange hole at least at three places uniformly distributed along the circumference so that oblique insertion of the screw element into the hole is avoided. Then the cylindrical end part of the known structure is redundant. Because the screw element is conical, it can be used for various hole diameters without detracting from the effectiveness of the screw element.

When a counter screw element is used in a registering hole of the opposite flange, this counter screw element also has, in accordance with the invention, a screwthread having at least three leads. It is thus ensured that the two screw elements are accurately axially in line with one another so that when the pressure member is loaded no extra bending stress is produced on the counter element.

In a preferred embodiment the top of the screw profile of each lead is flattened. In this way the surface pressure between lead and flange hole is reduced, which avoids damage of the flange hole. Nevertheless a satisfactory anchoring between screw element and flange hole remains ensured thanks to the potential high frictional forces.

In a further embodiment the head faces of the pressure member and the counter element have the shape of a ball and a cup respectively. Thus wear at the pressure faces is reduced when during spreading the flanges deflect not uniformly.

In the preferred embodiment the opening has a screwthread and the pressure member of formed by a screw bolt.

The invention will be described more fully hereinafter with reference to two embodiments.

Figure 2:
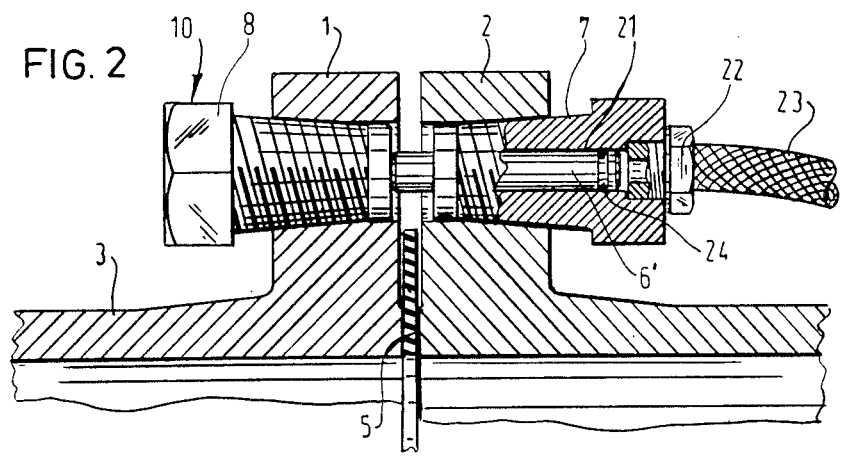
Figures 3, 4:
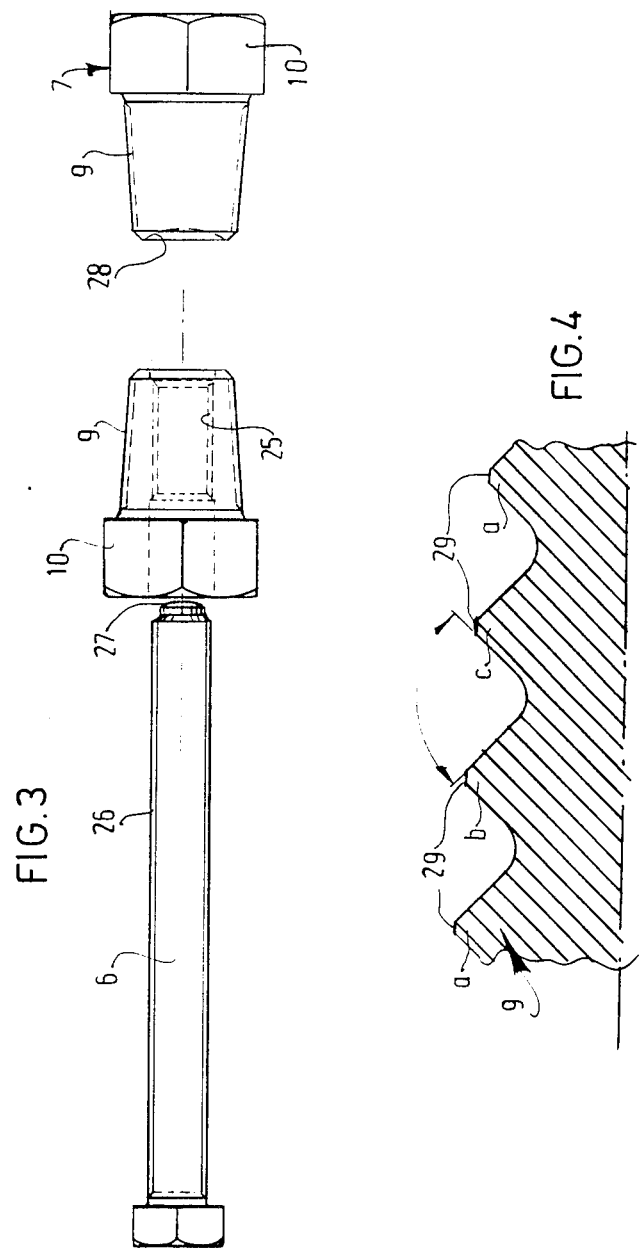

The drawing shows in:

FIG. 1 a side elevation and partly an axial sectional view of a flange joint in which a first embodiment of the spreading device is used, FIG. 2 an axial vertical sectional view, on an enlarged scale, of a hydraulic embodiment comprising a counter element, FIG. 3 a side elevation of the component parts of the device in an exploded view, FIG. 4 a detail of the lead of the screw elements.

The flanges 1, 2 shown in the figures serve to interconnect pipe elements 3, which connection can be established in a conventional manner by means of bolts 4.

In order to enable inspection or replacement of the packing between the flanges 1, 2 the flanges have to be movable away from one another over a given distance.

This can be performed by removing the fastening bolts 4 and by subsequently arranging the spreading device embodying the invention in a blank hole of flange 1 (see FIG. 1). The device comprises a pressure member 6, which can be reciprocated by means of screwthread (not shown) in a screw element in an axial sense. The screw element is conical and the conical part has a lead 9. This screwthread has three leads and will be described more fully with reference to FIG. 4. The screw element 7 has a hexagonal head so that by means of a normal wrench the screw element can be tightened in the blank hole of the flange 1. During this tightening part of each lead will come into contact with the inner side of the blank hole of the flange. Since there are three or more leads, there are three or more contact places uniformly distributed along the circumference between the screw element and the flange hole.

By tightening the pressure member 6 formed by a screw bolt the pressure head face can exert pressure on the other flange 2 and upon a further turn the flange 2 can be removed from the flange 1. The extent of the space depends on the length of the pressure member 6 and it will be obvious that in the case of a great length or a large space the bending load on the screw member 6 can considerably increase when the pressure member 6 is not accurately perpendicular to the flange 2. However, the design with at least three leads of the screwthread of the screw element 7 ensures the desired accurate alignment.

Because the screw element is conical (see also FIG. 3) it is also suitable for flange holes having diameters lying between the smallest and the largest diameter of the conical shaft part of the screw element 6.

FIG. 2 shows an embodiment corresponding with the spreading device of FIG. 1 as far as the outer form of the screw element 7 is concerned. There are furthermore used the blank holes in the flanges 1, 2 for the bolts 4. For spreading the opposite, registering hole of the other flange has to be closed by a counter screw element 10, the shape of which corresponds with that of the screw element 7. Also this element 10 has a conical shaft part having a screwthread of at least three leads, which ensures that the counter screw element is inserted accurately in line with the screw element 7 in the opposite flange part.

The screw element 7 has a smooth cylindrical bore 21, in which the pressure member 6' formed by a plunger is axially slidable. With the bore 21 can be adjoined a nipple 22 for the supply of a hydraulic or pneumatic medium through a hole 23 from any pressure source (not shown).

An O-ring 24 ensures the desired seal between the plunger 6' and the bore 21. By supplying pressurized medium the pressure member 6' shifts to the left and exerts pressure on the counter screw element 10 for spreading the flanges 1, 2.

FIG. 3 shows an embodiment in which the component parts consist of two screw elements having a hexogonal head 10 and an adjoining conical part with a screwthread having at least three leads 9. The left-hand screw element has a continuous hole having a screwthread 25, which co-operates with a screwthread 26 of a pressure member 6 formed by a screw bolt. It is noted that the head face of the screw bolt 6 is spherical and co-operates with a cup-shaped pressure head face 28 of the right-hand screw element 7. Thus wear at the pressure faces is avoided when during spreading of the flanges 1, 2 a slight angular deflection occurs between the pressure member 6 and the counter element 7.

FIG. 4 shows a detail of the profile of the three leads a, b, c. The top 29 thereof is flattened so that cutting of the leads in the flange holes and hence wear are avoided.

The flanks of neighbouring leads a-b, b-c, c-d are preferably at an angle of 90° to one another so that the strength of the leads and hence the strength of the screw element are appreciably enhanced.

The invention is not limited to the embodiments described above.

What is claimed is:

1. A device for spreading two flanges mounted in facing relation in a pipe system to allow temporary separation of the flanges for removal and replacement of a gasket between them, each flange having a plurality of holes adapted to receive fastening elements to hold the flanges in sandwiching relation to an intervening gasket, said device comprising a pressure element presenting a body having a conical threaded portion terminating at its large end in a non-circular head with the opposite, smaller end being of a diameter less than the diameter of said holes and the larger end of the conical body being of a diameter larger than the diameter of said holes, said body being threaded from its smaller end to its larger end and there being at least three separate threads each having a flattened top so that the threads may engage within a hole without cutting into the flange, said separate threads being distributed at equal angular distances around the circumference of said body so that when the body is seated within a hole, the tops of the threads seat therewithin in equally spaced circumferential relation in a plane perpendicular to the axis of the hole, and pressure means passing axially through said body for exerting axial pressure to separate said flanges.

2. A device as defined in claim 1 wherein the flanks of neighboring threads are at an angle of ninety degrees to each other.

3. A device as defined in claim 1 including a counterpressure element presenting a counterpressure body having a conical threaded portion terminating at its large end in a non-circular head with the opposite, smaller end being of a diameter less than the diameter of said holes and the larger end of the counterpressure body being of a larger diameter than the diameter of said holes, said counterpressure body being threaded from its smaller end to its larger end and there being at least three separate threads each having a flattened top so that the threads may engage within a hole without cutting into the flange, said separate threads of the counterpressure body being distributed at equal angular distances around the circumference of the counterpressure body so that when the counterpressure body is seated within a hole opposite to the hole within which the pressure body is seated, the tops of the threads seat therewithin in equally spaced circumferential relation in a plane perpendicular to the axis of the hole, said counterpressure body having a seat adapted to be engaged by said pressure means.

4. A device as defined in claim 3 wherein said pressure means includes an end shaped in the form of a ball and said seat of the counterpressure body is shaped in the form of a cup.

5. A device as defined in claim 4 wherein said pressure element is provided with an internally threaded axial bore and said pressure means is threaded therein.

6. A device as defined in claim 1 wherein said pressure element is provided with an internally threaded axial bore and said pressure means is threaded therein.

7. A device as defined in claim 2 wherein said pressure element is provided with an internally threaded axial bore and said pressure means is threaded therein.

8. A device as defined in claim 3 wherein said pressure element is provided with an internally threaded axial bore and said pressure means is threaded therein.

9. A device as defined in claim 8 wherein said pressure means includes and end shaped in the form of a ball and said seat of the counterpressure body is shaped in the form of a cup.

10. A device as defined in claim 9 wherein the flanks of neighboring threads of the pressure element and of the counterpressure element each are at an angle of ninety degrees to each other.

* * * * *